United States Patent
Fujita et al.

(10) Patent No.: US 8,465,723 B2
(45) Date of Patent: Jun. 18, 2013

(54) ARSENIC-CONTAINING SOLID AND METHOD FOR PRODUCING IT

(75) Inventors: Tetsuo Fujita, Akita (JP); Ryoichi Taguchi, Akita (JP); Hisashi Kubo, Akita (JP)

(73) Assignee: Dowa Metals & Mining Co., Ltd., Tokyo (JP)

(*) Notice: Subject to any disclaimer, the term of this patent is extended or adjusted under 35 U.S.C. 154(b) by 920 days.

(21) Appl. No.: 12/531,132

(22) PCT Filed: Mar. 13, 2008

(86) PCT No.: PCT/JP2008/055150
§ 371 (c)(1),
(2), (4) Date: Sep. 14, 2009

(87) PCT Pub. No.: WO2008/114833
PCT Pub. Date: Sep. 25, 2008

(65) Prior Publication Data
US 2010/0044631 A1    Feb. 25, 2010

(30) Foreign Application Priority Data
Mar. 15, 2007  (JP) ................. 2007-066320

(51) Int. Cl.
*C01G 49/00*  (2006.01)
*C01G 49/06*  (2006.01)

(52) U.S. Cl.
USPC ........ 423/594.1; 423/138; 423/140; 423/265; 423/275; 423/601; 423/602; 423/624; 252/182.33; 210/758; 210/759; 210/760

(58) Field of Classification Search
USPC .............. 423/138, 140, 265, 275, 594.1, 601, 423/624; 252/182.33; 210/758, 759, 760
See application file for complete search history.

(56) References Cited

U.S. PATENT DOCUMENTS

| | | | |
|---|---|---|---|
| 5,333,558 A * | 8/1994 | Lees, Jr. .................... | 110/346 |
| 7,695,698 B2 * | 4/2010 | Fujita et al. ................ | 423/87 |
| 7,858,056 B2 * | 12/2010 | Moyes et al. ............... | 423/22 |
| 2007/0014709 A1 * | 1/2007 | Moyes et al. ............... | 423/22 |
| 2008/0075644 A1 * | 3/2008 | Fujita et al. ................ | 423/87 |
| 2008/0233023 A1 * | 9/2008 | Kimura et al. ............. | 423/87 |
| 2009/0104107 A1 * | 4/2009 | Kimura et al. ............. | 423/594.1 |
| 2010/0044631 A1 * | 2/2010 | Fujita et al. ............... | 252/182.33 |
| 2010/0140179 A1 * | 6/2010 | Fujita et al. ............... | 210/688 |
| 2012/0045382 A1 * | 2/2012 | Inoue et al. ............... | 423/265 |

FOREIGN PATENT DOCUMENTS

| | | |
|---|---|---|
| JP | 54-160590 | 12/1979 |
| JP | 59-164639 | 9/1984 |
| JP | 6-206080 | 7/1994 |
| JP | 2008-105921 | 5/2008 |
| JP | 2008-126104 | 6/2008 |
| JP | 2008-143741 | 6/2008 |
| JP | 2008-150658 | 7/2008 |
| JP | 2008-150659 | 7/2008 |

* cited by examiner

*Primary Examiner* — Joseph D Anthony
(74) *Attorney, Agent, or Firm* — Clark & Brody (57) ABSTRACT

Provided is an arsenic-containing solid comprising 100 parts by mass of a scorodite-type iron-arsenic compound and at least 1 part by mass of an iron oxide compound added thereto, in which the scorodite-type iron-arsenic compound is produced by adding an oxidizing agent to an aqueous acidic solution that contains a 5-valent arsenic (V) ion and a 2-valent iron (II) ion, then promoting the precipitation of an iron-arsenic compound with stirring the liquid, and finishing the precipitation thereof within a range where the pH of the liquid is at most 1.2. The iron oxide compound includes goethite, hematite and their mixture, preferably having a BET specific surface area of at least 3 m²/g, more preferably at least 20 m²/g.

15 Claims, 2 Drawing Sheets

ARSENIC-CONTAINING SOLID AND METHOD FOR PRODUCING IT

TECHNICAL FIELD

The present invention relates to a solid mainly comprising a scorodite-type iron-arsenic compound, especially an arsenic-containing solid from which arsenic release is noticeably retarded, and to a method for producing it.

PRIOR ART

In nonferrous smelting, various smelting intermediates are produced, and there exist various forms of substances capable of being smelting materials. Such smelting intermediates and smelting materials may contain valuable metals, but on the other hand, contain arsenic or the like elements unfavorable for environments. For treatment of arsenic, proposed is a method of fixing arsenic in a solution as an arsenic compound by combining arsenous acid with iron, calcium or the like.

The arsenic compound collected as a precipitate is stored or discarded, and it is important that the compound releases little arsenic. As an arsenic compound releasing little arsenic, known is scorodite ($FeAsO_4.2H_2O$), an iron-arsenic compound of good crystallinity. However, it is not easy to produce a scorodite crystal as a low bulky form of good filterability, and an industrial-scale arsenic treatment process of producing a scorodite crystal has not as yet been realized.
Patent Reference 1: JP-A54-160590

Problems that the Invention is to Solve

The present inventors have assiduously studied and have developed novel arsenic fixation methods and disclosed them in Japanese Patent Application Nos. 2006-126896, 2006-321575, 2006-311063, 2006-332857, etc. According to the techniques, it has become possible to produce a scorodite-type crystalline iron-arsenic compound that releases little arsenic and has a low bulky form, from an arsenic-containing liquid. Basically, the techniques comprise adding an oxidizing agent such as oxygen gas or the like to an aqueous solution containing a 5-valent arsenic ion (V) and a 2-valent iron (II) ion to form an iron-arsenic compound of good crystallinity (hereinafter this reaction may be referred to as "iron-arsenic reaction"), followed by collecting the iron-arsenic compound as a solid from the slurry. In the iron-arsenic compound, arsenic is fixed with an extremely high grade to a degree of 30% by mass or so, and the arsenic that constitutes the compound is extremely hardly released away. Accordingly, the crystalline iron-arsenic compound is suitable for disposal and storage thereof.

However, in the produced scorodite-type iron-arsenic compound particles, there exists minor arsenic adhering to the surfaces of the particles in addition to the arsenic that constitutes the compound itself. The present inventors have already disclosed that, when the time for iron-arsenic reaction is sufficiently prolonged and when the produced scorodite-type iron-arsenic compound is fully washed, then the arsenic release maybe reduced to at most 0.3 mg/L. However, too much prolonging the time for iron-arsenic reaction brings about producibility depression in industrial-scale production. Elaborate washing takes much trouble and requires much water. Wastewater after used in washing must be treated under severe control.

On the other hand, it may be considered theoretically possible to retard arsenic release by making a large quantity of a calcium-containing substance (CaO, etc.) coexist along with an iron-arsenic compound. In this case, arsenic adhering to the iron-arsenic compound is trapped as calcium arsenate. In general, however, calcium arsenate redissolves when the ambient pH lowers, and therefore, it is undesirable to employ only the method for preventing arsenic release. In this connection, there is known a method of adding scorodite to a nonferrous smelting converter or the like, instead of discarding it, and vitrifying it along with slag therein; however, the compound is not always stable but may rather bring about arsenic redissolution.

In an industrial-scale process, operational error in handling must be taken into consideration in the production step or the washing step for the iron-arsenic compound. For example, when the iron-arsenic reaction time is shortened, it may be considered that the amount of arsenic adhering to the iron-arsenic compound may increase more than usual. Regarding the condition for the iron-arsenic reaction, when the temperature, the initial arsenic concentration, the stirring intensity and the amount of the oxidizing agent added lower, then it may be considered that the particle size maybe too small and the arsenic release from the crystal itself may increase in some degree. In case where the amount of the washing water to be used is too small and the washing method is incomplete, then it may also be considered that the removal of arsenic adhering to the particles may be insufficient. Further, when the environment where the deposited/stored iron-arsenic compound is shifted to an alkaline side, then the concern about it is that the arsenic release from the scorodite crystal may increase. In the release test based on the laws and the ordinances in our country, distilled water is used; however, it is desirable for arsenic treatment workers to take by themselves some measures to pH fluctuation in the release environment.

Taking the current situation as above in consideration, the present invention is to provide an industrially practicable arsenic fixation technique capable of stably reducing the amount of arsenic release to an extremely low level.

Means for Solving the Problems

As a result of detailed studies, the present inventors have found that, when the low-bulky scorodite-type iron-arsenic compound obtained according to the production method for a crystalline iron-arsenic compound disclosed in Japanese Patent Application No. 2006-321575 and others is used and when an iron oxide compound is made to coexist along with it, then the above-mentioned object can be attained.

Specifically, in the invention, there is provided an arsenic-containing solid that comprises 100 parts by mass (mass in dry—the same shall apply hereinunder) of a scorodite-type iron-arsenic compound and at least 1 part by mass (mass in dry—the same shall apply hereinunder) of an iron oxide compound added thereto. One preferred embodiment of the iron oxide compound is in the form of powdery particles having a BET specific surface area of at least 3 $m^2/g$; and a more preferred embodiment thereof has the specific surface area of at least 20 $m^2/g$. When the iron oxide compound having a BET specific surface area of at least 3 $m^2/g$ is used and when the amount of the iron oxide compound to be in the solid composition is at least 5 parts by mass relative to 100 parts by mass of the scorodite-type iron-arsenic compound therein, then the composition exhibits an extremely good effect of arsenic release retardation. When the iron oxide compound having a BET specific surface area of at least 20 $m^2/g$ is used, then the amount of the iron oxide compound to be in the solid composition may be small, concretely at least 0.5 parts by mass relative to 100 parts by mass of the scorodite-type iron-arsenic compound therein and the composition exhibits the extremely good effect of arsenic release retardation in that range.

"Iron oxide compound" as referred to herein includes iron oxide and iron oxyhydroxide (hydrous iron oxide). "Scorodite-type iron-arsenic compound" is a compound that gives an X-ray diffraction pattern corresponding to a crystal of scorodite ($FeAsO_4.2H_2O$); but it may be contaminated with impurities so far as it has an ability of arsenic fixation to such a degree that, in one washing with water, the arsenic release from it in the release test in Comparative Example 1 given below is retarded to at most 3 mg/L.

One preferred embodiment of the scorodite-type iron-arsenic compound is a crystalline compound produced by adding an oxidizing agent to an aqueous acidic solution that contains a 5-valent arsenic (V) ion and a 2-valent iron (II) ion, then promoting the precipitation of an iron-arsenic compound with stirring the liquid, and finishing the precipitation thereof within a range where the pH of the liquid is at most 1.2. As the iron oxide compound, preferably employed is at least one of iron oxyhydroxide (FeOOH) and diiron trioxide ($Fe_2O_3$).

The arsenic-containing solid can be produced according to a method of using a crystal of a scorodite-type iron-arsenic compound having been processed in at least one solid-liquid separation step after its synthesis, preparing a slurry or a wet cake where the crystal particles and powdery particles of an iron oxide compound coexist together, and collecting the solid that constitutes the slurry or the wet cake.

The invention has realized an arsenic-containing solid of an iron-arsenic compound having an extremely high arsenic grade of 30% by mass or so, from which the arsenic release is reduced to an extremely low level. For the arsenic-containing solid, the technique of producing an iron-arsenic compound that the present applicant has disclosed in Japanese Patent Application No. 2006-321575 and others can be utilized; and the relatively simple method of incorporating a powder of an iron oxide compound in an iron-arsenic compound produces the stable and excellent effect of arsenic release retardation. With that, the operation of shortening the reaction time for the iron-arsenic reaction and the operation of reducing the washing load have become possible. In addition, the release retardation effect is significantly enhanced in a case where the release environment is shifted to an alkali side. Further, even in a case where an iron-arsenic compound that may release some more arsenic than usual is formed owing to the trouble in the iron-arsenic compound production step or the washing step, the increase in the arsenic release from that compound may be minimized and undesirable arsenic release can be prevented. Accordingly, the invention contributes toward the industrialization of the arsenic fixation technique disclosed in Japanese Patent Application No. 2006-321575, etc.

PREFERRED EMBODIMENTS OF THE INVENTION

Figure 1:
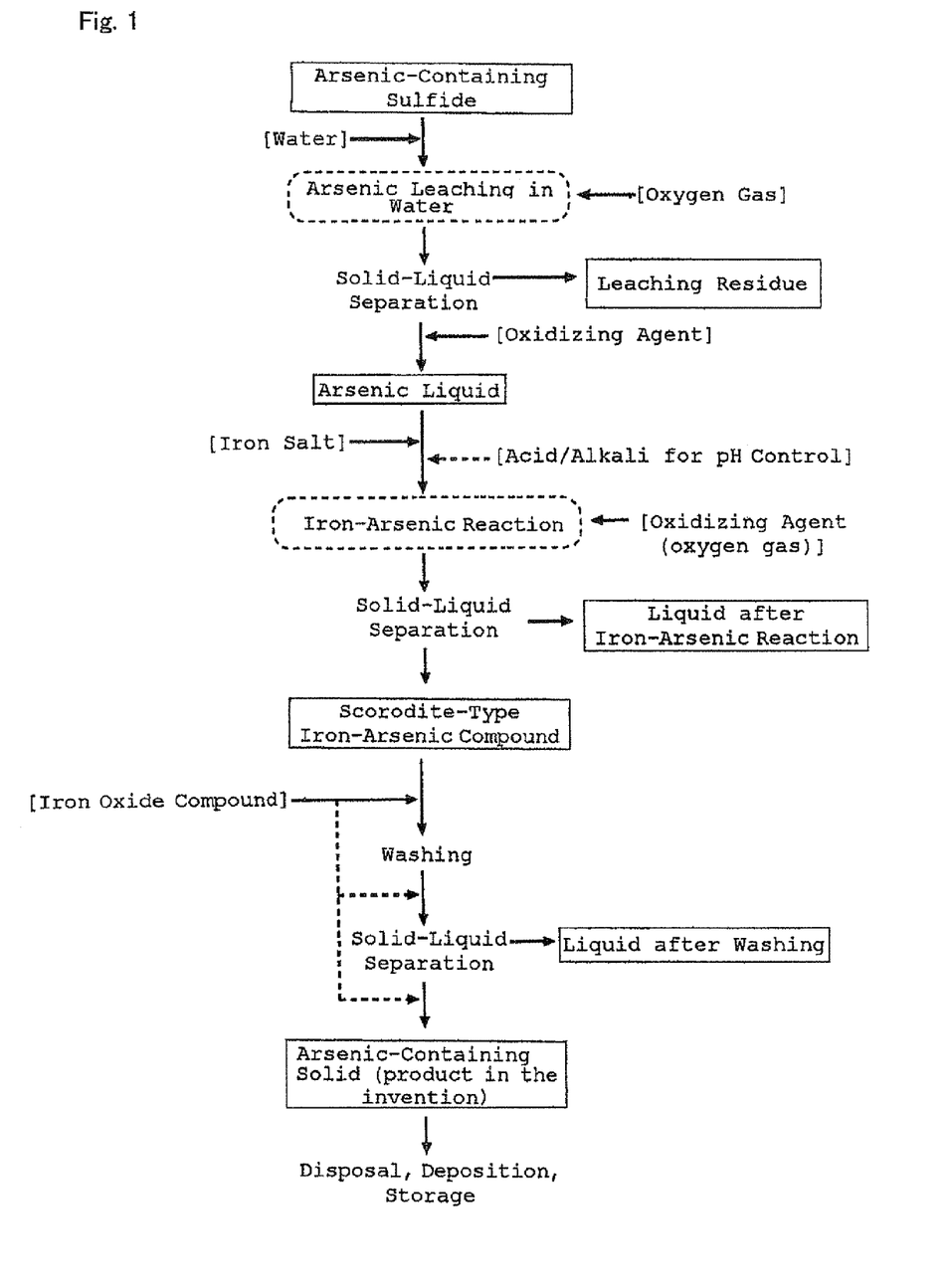
FIG. 1 is a view showing a typical flowchart for producing an arsenic-containing solid of the invention.

FIG. 1 shows a typical flowchart for producing an arsenic-containing solid of the invention. The scorodite-type iron-arsenic compound may be obtained according to the method disclosed in Japanese Patent Application No. 2006-321575 or the like. In the invention, a predetermined amount of an iron oxide compound is incorporated in the iron-arsenic compound to give an iron-arsenic solid where the iron-arsenic compound and the iron oxide compound coexist together. The solid has a high arsenic grade and is noticeably protected from arsenic release from it, and is therefore suitable for disposal, deposition and storage. The steps are described below.

<<Preparation of Arsenic Liquid>>

As a starting liquid for producing a scorodite-type iron-arsenic compound, an arsenic liquid (liquid with arsenic dissolving therein) is prepared. The arsenic liquid may be produced according to a method of leaching arsenic from an arsenic-containing substance formed in a smelting process. As the method, for example, preferably employed is the method that the present applicant has disclosed in Japanese Patent Application No. 2006-339154, No. 2006-339156, etc. For example, in case where an arsenic-containing substance mainly comprising a sulfide represented by a compositional formula of $As_2S_3$ or CuS is used, oxygen gas is added to an aqueous slurry suspension of the sulfide to promote arsenic leaching reaction therein with stirring, and after the reaction, the slurry is processed for solid-liquid separation and thereafter the liquid is collected to be an arsenic liquid (liquid with arsenic dissolving therein). In promoting the leaching reaction, the oxygen partial pressure in the vapor phase that is in contact with the slurry liquid surface is at most 0.6 MPa. The process may be attained in an open system where the liquid is open to air. Water that constitutes the slurry to be processed for the leaching reaction may be water with no alkali hydroxide added thereto; however, some alkali hydroxide may be present therein with no problem in realizing a high degree of arsenic leaching. Concretely, an arsenic-containing sulfide may be mixed in water in which the alkali hydroxide concentration is limited to be from 0 to 1 mol/L, thereby preparing the slurry. The arsenic leaching reaction is attained preferably at 60° C. or higher, and may be attained in an open-tank system when the temperature is not higher than 100° C. Preferably, the oxidation-reduction potential (ORP, Ag/AgCl electrode) of the slurry after the reaction is at least 200 mv.

In case where the arsenic-containing substance is not a sulfide but a copper-arsenic compound, an oxidizing agent such as oxygen gas or the like is added to an aqueous slurry suspension of a copper-arsenic compound-containing substance, and stirred to promote the arsenic leaching reaction in the presence of simple sulfur or in the presence of an $S^{2-}$ ion, and after the reaction, the slurry is processed for solid-liquid separation and thereafter the liquid is collected to be an arsenic liquid. As the $S^{2-}$ ion source substance, usable is elemental sulfur or zinc sulfide (ZnS) The arsenic leaching reaction of the type is accompanied by copper sulfidization. Preferably, the supply of sulfur is at least 1 equivalent to the amount of copper in the copper arsenic compound-containing substance.

The arsenic liquid thus obtained in the manner as above generally comprises arsenic (III) as the main ingredient thereof. For using it in production of a scorodite-type iron-arsenic compound, it must be converted into arsenic (V). For this, for example, preferably employed is a method of adding thereto an oxidizing agent such as $MnO_2$, $PbO_2$ or the like along with a mineral acid (e.g., sulfuric acid) thereto. According to a process comprising oxidizing leaching arsenic from an arsenic-containing substance using a strong alkali liquid, followed by calcium reaction, then washing it and redissolving it in sulfuric acid, arsenic (V) liquid may also be produced. However, for industrial-scale mass-production, preferred is the above-mentioned process of leaching arsenic in water.

<<Production of Scorodite-Type Iron-Arsenic Compound>>

For the method of producing a scorodite crystal-based iron-arsenic compound from the arsenic liquid, for example, preferably employed is the method that the present applicant has disclosed in Japanese Patent Application No. 2006-321575. Specifically, an oxidizing agent is added to an aqueous solution containing arsenic (V) ion and iron (II) ion to promote the reaction for precipitation of an iron-arsenic compound with stirring the liquid (in this description, the reaction is referred to as "iron-arsenic reaction"), and the precipitation of the crystal is finished within a pH range of the liquid of from 0 to 1.2, thereby giving a low-bulky compact iron-arsenic compound from which arsenic is extremely hardly released out. In this case, preferably, the arsenic concentration in the liquid before the start of the precipitation reaction is at least 15 g/L (liter). When the arsenic concentration in the arsenic liquid is 25 g/L or more, then the above-mentioned reaction is finished preferably within a pH range of the liquid of from −0.45 (minus 0.45) to 1.2. Preferably, the pH of the arsenic liquid before the reaction (pre-reaction pH) is within a range of from more than 0 to 2.0. As the iron ion (II) source, for example, usable is a sulfate. The arsenic liquid may contain one or more of sodium, potassium, copper, zinc, manganese and magnesium in a total concentration of from 1 to 150 g/L. It is not always easy to measure the pH of the liquid at a high temperature, and therefore, the pH of the high-temperature liquid (for example, at higher than 60° C.) may be determined by sampling the liquid and then measuring the pH of the liquid sample after left cooled to 60° C. or lower. After the iron-arsenic compound crystal is formed in the manner as above, the crystalline iron-arsenic compound is isolated through solid-liquid separation as a solid fraction, and this is collected. The solid fraction comprises mainly a scorodite-type iron-arsenic compound.

<<Incorporation of Iron Oxide Compound>>

Using the thus-obtained scorodite-type iron-arsenic compound, a solid product is produced in which crystal particles of the compound and particles of an iron oxide compound coexist together.

It has been found that the iron oxide compound in the solid product adsorbs arsenic adhering to the iron-arsenic compound particles or arsenic slightly released from the iron-arsenic compound crystal, therefore acting for noticeably reducing the arsenic release from the solid product. As the iron oxide compound acting for adsorbing arsenic, there are mentioned iron oxide and iron oxyhydroxide. Iron oxide includes diiron trioxide and triiron tetroxide. Typical examples of diiron trioxide include hematite ($\alpha$-$Fe_2O_3$) and maghemite ($\gamma$-$Fe_2O_3$). A typical example of triiron tetroxide is magnetite ($Fe_3O_4$) Iron oxyhydroxide includes goethite ($\alpha$-FeOOH), akaganeite ($\beta$-FeOOH) and lepidocrocite ($\gamma$-FeOOH). One of these may be incorporated singly, or two or more may be incorporated as combined.

Recently, powders of the iron oxide compound having a particle size of from a few nm (nanometer)—order to several tens nm—order have been produced, and are widely used in the field of magnetic recording media, etc. Such fine powders maybe used in the invention, but in consideration of the cost and the handlability thereof, preferred for use herein is an iron oxide compound having $D_{50}$, as measured with a laser diffractiometric particle sizer, of at least 0.1 µm (100 nm) or so. However, when the particle size is too large, then the specific surface area of the particles may be small, and therefore, a large quantity of the iron oxide compound is needed for sufficiently exhibiting its capability of adsorbing arsenic, and such large particles are undesirable. To that effect, for example, preferred for use herein are the particles having a mean particle size $D_{50}$ of at most 50 µm.

Regarding the specific surface area of the iron oxide compound, the compound may have a BET specific surface area (specific surface area according to a BET one-point method) of at least around 1 $m^2/g$ in order to attain its effect of reducing arsenic release. Regarding the amount of the iron oxide compound to be incorporated, the iron oxide compound must be at least 1 part by mass relative to 100 parts by mass of the iron-arsenic compound. When the amount is less than the range, then it is unfavorable since the effect of the compound for reducing arsenic release may be small as compared with the case not containing the iron oxide compound. When the BET specific surface area of the iron oxide compound is at least 3 $m^2/g$, then the compound may attain more efficient arsenic adsorption. In this case, it is needless to say that, when the amount of the iron oxide compound to be incorporated is at least 1 part by mass relative to 100 parts by mass of the iron-arsenic compound, then the iron oxide compound can favorably exhibit its effect of reducing arsenic release; but especially when the amount of the iron oxide compound to be incorporated is at least 5 parts by mass, then the arsenic release may remarkably reduce.

Recently, an industrial goethite production technique in a wet process has been established, and for example, a powder having a mean particle size $D_{50}$ of from 0.1 to 50 µm or so and having a BET specific surface area of at least 20 $m^2/g$ is obtained relatively easily. When the iron oxide compound having such a large specific surface area is used, then it may exhibit its excellent effect of arsenic release retardation even when its amount is in a small range of at least 0.5 parts by mass relative to 100 parts by mass of the iron-arsenic compound; and when its amount is at least 1.0 parts by mass, then the compound can stably exhibit its extremely excellent effect. When the BET specific surface area is at least 30 $m^2/g$, then the compound is more effective; and when the area is at least 40 $m^2/g$, the compound is even more effective. The uppermost limit of the BET specific surface area is not specifically defined, but in practice, at most 100 $m^2/g$ could be enough for it. When a BET 3-point method is applied to those having a specific surface area according to a BET 1-point method of at most 100 $m^2/g$, then they may have a large value of, for example, from 150 to 300 $m^2/g$ or so.

The uppermost limit of the amount of the iron oxide compound to be incorporated is not also specifically defined. However, when the compound is incorporated too much, then it may produce some disadvantages in that the arsenic grade of the arsenic-containing solid for disposal, deposition and storage may lower. In case where the arsenic-containing solid for disposal, deposition, storage or the like could have an arsenic grade of at least 20% by mass, then it may be said that the arsenic grade of the solid could be high with reference to the conventional arsenic fixation technique (in which a solid having an arsenic grade of about 5% by mass or so is obtained through iron co-precipitation in a ratio of Fe/As of around 10). The scorodite-type iron-arsenic compound produced according to the method disclosed in Japanese Patent Application No. 2006-321575 or the like may have an arsenic grade of at least around 30% by mass. A scorodite-type iron-arsenic compound typically having an arsenic grade of 32% by mass is simulated, and the amount of the iron oxide compound to be incorporated is 1 part by mass, 10 parts by mass or 50 parts by mass relative to 100 parts by mass of the iron-arsenic compound. In those cases, the arsenic grade of the arsenic-containing solid to be obtained is computed, and it is 31.7% by mass, 29.1% by mass and 21.3% by mass, respectively. In that situation, in order to keep the amount to be incorporated of the obtained arsenic-containing solid high, at least 20% by mass, the amount of the iron oxide compound to be incorporated may be within a range of at most 50 parts by mass. Accordingly, in the invention, it is practicable and is favorable that the amount of the iron oxide compound to be incorporated is at most 50 parts by mass relative to 100 parts by mass of the iron-arsenic compound. As a result of various investigations, in general, good results can be obtained when the amount is within a range of at most 10 parts by mass. In this description, "part by mass" is based on the mass in dry.

In order to obtain the arsenic-containing solid in which the scorodite-type iron-arsenic compound and the iron oxide compound coexist in the ratio as above, for example, the following methods are employable.

(1) Method of Making the Two Coexist in Slurry:

In the slurry after iron-arsenic reaction (iron-arsenic reaction slurry), a scorodite-type iron-arsenic compound is present; however, it is not so good to add an iron oxide compound directly to the iron-arsenic reaction slurry. When an iron oxide compound is added to the slurry in that stage, then the compound may be consumed for adsorbing the unreacted arsenic remaining in the iron-arsenic reaction slurry. In addition, it may be considered that the iron oxide compound added may be dissolved in some degree owing to the influence thereof of the acid existing in the iron-arsenic reaction slurry. Accordingly, a large quantity of the iron oxide compound must be added in order to sufficiently secure the compound that may coexist along with the scorodite-type iron-arsenic compound. Therefore, it is desirable to use a scorodite-type iron-arsenic compound after at least one solid-liquid separation step later than the stage of the iron-arsenic reaction slurry. Concretely, for example, in repulping with water for washing the iron-arsenic compound separated from the iron-arsenic reaction slurry through solid-liquid separation, a powder of an iron oxide compound is added thereto to prepare a slurry in which scorodite-type iron-arsenic compound particles and iron oxide compound particles coexist together, and thereafter the slurry is processed for solid-liquid separation to collect the solid fraction from it. The thus-collected solid fraction corresponds to the arsenic-containing solid of the invention.

(2) Method of Making the Two Coexist in Wet Cake:

Also in this case, the scorodite-type iron-arsenic compound after at least one solid-liquid separation step after the stage of the iron-arsenic reaction slurry may be used and the washing process for it may be utilized. Concretely, for example, in producing a wet cake of an iron-arsenic compound using a filter press, belt filter, centrifuge or the like in the washing process, an iron oxide compound is added thereto along with additional water thereto, thereby giving a wet cake in which scorodite-type iron-arsenic compound particles and iron oxide compound particles coexist together, and thereafter the wet cake is collected as a solid fraction. Also in this case, the thus-collected solid fraction corresponds to the arsenic-containing solid of the invention.

In these methods of adding an iron oxide compound to the system in the washing step therein, any careful washing operation like in a case where an iron oxide compound is not added is not needed, and therefore the load to the washing step in these methods may be reduced, and water may be saved.

(3) Method of Adding Iron Oxide Compound in Storage Site:

In this case, in storage site where an iron-arsenic compound is discarded, stored or the like, water that contains an iron oxide compound is spread on the iron-arsenic compound during or after the deposition work, thereby producing an arsenic-containing solid where scorodite-type iron-arsenic compound particles and iron oxide compound particles coexist together.

In addition, it is also effective to make an iron oxide compound exist in a site where water seeping out through the storage site is to be stopped, for preventing arsenic outflow through the site.

EXAMPLES

Comparative Example 1

In this, a reagent, arsenic liquid (by Wako Pure Chemical Industries, $H_3AsO_4$ content 62%), and a reagent, ferrous sulfate 7-hydrate (by Wako Pure Chemical Industries, $FeSO_4 \cdot 7H_2O$) were used, and 4 L (liters) of an iron/arsenic-containing liquid having an arsenic (V) concentration of 50 g/L and an iron (II) concentration of 55.9 g/L was prepared. The molar ratio of Fe/As in the liquid was about 1.5. The iron/arsenic-containing liquid was put into a reactor, and was forcedly stirred with a 2-stage disc turbine with four baffles set therein, at 800 rpm. The liquid in that state was heated, and when its temperature reached 95° C., oxygen gas having a purity of 99% was introduced into it kept open to air, at a rate of 4 L/min. Before oxygen gas introduction, the pH of the liquid was 1.15. With stirring, the temperature of the liquid was kept at 95° C., and oxygen introduction was continued for 3 hours to promote the precipitation reaction (iron-arsenic reaction). After the temperature of the slurry lowered to 70° C., this was processed for solid-liquid separation with a pressure filter, and the solid was collected. The solid fraction (wet cake) was repulped with pure water to have a pulp concentration of 100 g/L, and then stirred with a 2-stage disc turbine with four baffles set therein, at 500 rpm for repulping washing for 1 hour, and thereafter this was filtered at a temperature of 30° C. to collect a solid fraction. The solid fraction was dried at 60° C. for 18 hours. The resulting dry solid was analyzed for the X-ray diffraction pattern thereof. For the analysis, used was Rigaku RINT-2500 with Cu-Kα. The scintillation counter condition was as follows: The tube voltage was 40 kV; the tube current was 300 mA; the scanning speed was 0.01/sec; and the scanning angle 2θ was from 5° to 85°. As a result, the dry solid was identified as a scorodite-type iron-arsenic compound (the same shall apply to Examples given below) As a result of analysis thereof, the arsenic grade of the dry solid was about 32% by mass (the same shall apply to Examples given below).

The dry solid obtained in the manner as above was tested in a release test. The test method conforms to Notification No. 13 by the Ministry of the Environment in Japan. Briefly, the dry solid was mixed with distilled water controlled to pH 5, in a ratio by mass of 1/10 to give a slurry (this is referred to as "slurry for release test"), and the slurry was shaken with a shaking machine for 6 hours, then processed for solid-liquid separation, and the filtrate was analyzed. As a result, the pH after shaken was 3.61, and the arsenic concentration was 0.26 mg/L. In one-pass repulping washing, the sample passed the environmental standard level of 0.3 mg/L, but in actually discarding or storing it, it is desired to further reduce the arsenic release from the solid.

The results of the release test are shown in Table 1. In Table 1, Fe and S release concentrations are also shown.

Example 1

A dry solid of a scorodite-type iron-arsenic compound was produced in the same manner as in Comparative Example 1.

On the other hand, as an iron oxide compound, iron oxide of a special grade reagent (by Kanto Chemical) was prepared.

The iron oxide compound was analyzed for the X-ray diffraction pattern thereof (the test condition was the same as in the above). As a result, the iron oxide compound was identified as hematite ($\alpha$-$Fe_2O_3$).

The particle size distribution of the iron oxide compound was determined, using a laser diffractiometric particle sizer (Horiba Seisakushols LA-500), and the mean particle size $D_{50}$ of the compound was 20.22 μm.

Further, according to a BET 1-point method (using Yuasa Ionics' Monosorb), the BET specific surface area of the iron oxide compound was measured. The BET specific surface area of the compound was 4.64 $m^2/g$.

In the release test as in Comparative Example 1, the above-mentioned iron oxide compound (hematite) was added to the slurry comprising the dry solid of the scorodite-type iron-arsenic compound, thereby preparing a release test slurry. In this, the amount of the iron oxide compound incorporated was 10 parts by mass relative to 100 parts by mass of the iron-arsenic compound. "Part by mass" is based on the dry mass (the same shall apply to Examples given below). The slurry was tested in the release test under the same condition as in Comparative Example 1 except that the iron oxide compound was added thereto. The release test slurry contains scorodite-type iron-arsenic compound particles and iron oxide compound particles coexisting therein, and in case where the solid fraction is directly collected from the slurry as it is, then the slurry shall give an arsenic-containing solid of the invention. In other words, the release test tried herein corresponds to the release test for the arsenic-containing solid of the invention.

As a result of the release test, the pH after shaken was 3.72, and the arsenic concentration was 0.02 mg/L.

Example 2

A release test slurry was prepared and tested in the same release test as in Example 1, for which, however, the amount of the iron oxide compound was 5 parts by mass relative to 100 parts by mass of the iron-arsenic compound. As a result, the pH after shaken was 3.79, and the arsenic concentration was 0.04 mg/L.

Example 3

A release test slurry was prepared and tested in the same release test as in Example 1, for which, however, the amount of the iron oxide compound was 2 parts by mass relative to 100 parts by mass of the iron-arsenic compound. As a result, the pH after shaken was 3.68, and the arsenic concentration was 0.13 mg/L.

Example 4

A release test slurry was prepared and tested in the same release test as in Example 1, for which, however, the amount of the iron oxide compound was 1 part by mass relative to 100 parts by mass of the iron-arsenic compound. As a result, the pH after shaken was 3.74, and the arsenic concentration was 0.14 mg/L.

Example 5

In the same manner as in Comparative Example 1, a dry solid of a scorodite-type iron-arsenic compound was obtained.

On the other hand, an iron oxide compound was produced in the manner mentioned below. A reagent, ferrous sulfate 7-hydrate (by Wako Pure Chemical Industries, $FeSO_4 \cdot 7H_2O$) was dissolved in pure water so as to have a controlled iron (II) concentration of 50 g/L, and 1.5 equivalents, relative to the alkali equivalent of iron, of sodium hydroxide was added thereto. Then, the liquid was heated up to 50° C. and stirred with gradually bubbled with air, thereby giving a yellow precipitate. The reaction was in a batchwise mode, and therefore the pH after the reaction was 2. The precipitate was collected through solid-liquid separation, and this was dried to be a dried iron oxide compound.

The iron oxide compound was analyzed in the same manner as in Example 1 to thereby determine the X-ray diffraction pattern, the mean particle size $D_{50}$ and the BET specific surface area thereof. As a result, the iron oxide compound was identified as goethite ($\alpha$-FeOOH), the mean particle size $D_{50}$ thereof was 8.59 μm, and the BET specific surface area thereof was 40.91 $m^2/g$.

In the release test as in Comparative Example 1, the release test slurry was prepared by adding the iron oxide compound (goethite) to the slurry of a dry solid of the scorodite-type iron-arsenic compound. In this, the amount of the iron oxide compound was 10 parts by mass relative to 100 parts by mass of the iron-arsenic compound. The slurry was tested in the release test under the same condition as in Comparative Example 1 except that the iron oxide compound was added thereto. As a result, the pH after shaken was 3.31, and the arsenic concentration was less than 0.01 mg/L (lower than the detection limit).

Example 6

A release test slurry was prepared and tested in the same release test as in Example 5, for which, however, the amount of the iron oxide compound was 5 parts by mass relative to 100 parts by mass of the iron-arsenic compound. As a result, the pH after shaken was 3.46, and the arsenic concentration was less than 0.01 mg/L (lower than the detection limit).

Example 7

A release test slurry was prepared and tested in the same release test as in Example 5, for which, however, the amount of the iron oxide compound was 2 parts by mass relative to 100 parts by mass of the iron-arsenic compound. As a result, the pH after shaken was 3.58, and the arsenic concentration was 0.01 mg/L.

Example 8

A release test slurry was prepared and tested in the same release test as in Example 5, for which, however, the amount of the iron oxide compound was 1 part by mass relative to 100 parts by mass of the iron-arsenic compound. As a result, the pH after shaken was 3.62, and the arsenic concentration was 0.03 mg/L.

Example 9

In the same manner as in Comparative Example 1, a dry solid of a scorodite-type iron-arsenic compound was obtained.

On the other hand, goethite produced in Example 5 was heated at 200° C. in air for 24 hours, and this was used herein as an iron oxide compound.

The iron oxide compound was analyzed in the same manner as in Example 1 to thereby determine the X-ray diffraction pattern, the mean particle size $D_{50}$ and the BET specific surface area thereof. As a result, the iron oxide compound was identified as a mixture of goethite ($\alpha$-FeOOH) and hematite ($\alpha$-Fe$_2$O$_3$). The compound would have sintered in some degree between the original particles therein, and the mean particle size $D_{50}$ thereof was 25.48 µm, and the BET specific surface area thereof was 46.59 m$^2$/g.

In the release test as in Comparative Example 1, the release test slurry was prepared by adding the iron oxide compound (mixture of goethite and hematite) to the slurry of a dry solid of the scorodite-type iron-arsenic compound. In this, the amount of the iron oxide compound was 10 parts by mass relative to 100 parts by mass of the iron-arsenic compound. The slurry was tested in the release test under the same condition as in Comparative Example 1 except that the iron oxide compound was added thereto. As a result, the pH after shaken was 3.56, and the arsenic concentration was less than 0.01 mg/L (lower than the detection limit).

Example 10

A release test slurry was prepared and tested in the same release test as in Example 9, for which, however, the amount of the iron oxide compound was 5 parts by mass relative to 100 parts by mass of the iron-arsenic compound. As a result, the pH after shaken was 3.65, and the arsenic concentration was 0.01 mg/L.

Example 11

A release test slurry was prepared and tested in the same release test as in Example 9, for which, however, the amount of the iron oxide compound was 2 parts by mass relative to 100 parts by mass of the iron-arsenic compound. As a result, the pH after shaken was 3.71, and the arsenic concentration was 0.01 mg/L.

Example 12

A release test slurry was prepared and tested in the same release test as in Example 9, for which, however, the amount of the iron oxide compound was 1 part by mass relative to 100 parts by mass of the iron-arsenic compound. As a result, the pH after shaken was 3.77, and the arsenic concentration was 0.04 mg/L.

Example 13

In the same manner as in Comparative Example 1, a dry solid of a scorodite-type iron-arsenic compound was obtained.

On the other hand, an iron oxide compound was produced in the manner mentioned below. A reagent, ferrous sulfate 7-hydrate (by Wako Pure Chemical Industries, FeSO$_4$.7H$_2$O) was dissolved in pure water so as to have a controlled iron (II) concentration of 5 g/L, and 1.5 equivalents, relative to the alkali equivalent of iron, of sodium hydroxide was added thereto. Then, the liquid was heated up to 50° C. and stirred with gradually bubbled with air, thereby giving a yellow precipitate. The reaction was in a batchwise mode, and therefore the pH after the reaction was 8. The precipitate was collected through solid-liquid separation, and this was dried to be a dried iron oxide compound.

The iron oxide compound was analyzed in the same manner as in Example 1 to thereby determine the X-ray diffraction pattern, the mean particle size $D_{50}$ and the BET specific surface area thereof. As a result, the iron oxide compound was identified as goethite ($\alpha$-FeOOH), the mean particle size $D_{50}$ thereof was 9.01 µm, and the BET specific surface area thereof was 46.57 m$^2$/g.

In the release test as in Comparative Example 1, the release test slurry was prepared by adding the iron oxide compound (goethite) to the slurry of a dry solid of the scorodite-type iron-arsenic compound. In this, the amount of the iron oxide compound was 10 parts by mass relative to 100 parts by mass of the iron-arsenic compound. The slurry was tested in the release test under the same condition as in Comparative Example 1 except that the iron oxide compound was added thereto. As a result, the pH after shaken was 6.70, and the arsenic concentration was less than 0.01 mg/L (lower than the detection limit).

Example 14

A release test slurry was prepared and tested in the same release test as in Example 13, for which, however, the amount of the iron oxide compound was 5 parts by mass relative to 100 parts by mass of the iron-arsenic compound. As a result, the pH after shaken was 6.08, and the arsenic concentration was less than 0.01 mg/L (lower than the detection limit).

Example 15

A release test slurry was prepared and tested in the same release test as in Example 13, for which, however, the amount of the iron oxide compound was 2 parts by mass relative to 100 parts by mass of the iron-arsenic compound. As a result, the pH after shaken was 5.07, and the arsenic concentration was less than 0.01 mg/L (lower than the detection limit).

Example 16

A release test slurry was prepared and tested in the same release test as in Example 13, for which, however, the amount of the iron oxide compound was 1 part by mass relative to 100 parts by mass of the iron-arsenic compound. As a result, the pH after shaken was 4.30, and the arsenic concentration was less than 0.01 mg/L (lower than the detection limit).

Example 17

In the same manner as in Comparative Example 1, a dry solid of a scorodite-type iron-arsenic compound was obtained.

On the other hand, goethite produced in Example 13 was heated at 250° C. in air for 24 hours, and this was used herein as an iron oxide compound.

The iron oxide compound was analyzed in the same manner as in Example 1 to thereby determine the X-ray diffraction pattern, the mean particle size $D_{50}$ and the BET specific surface area thereof. As a result, the iron oxide compound was identified as hematite (α-Fe$_2$O$_3$). The compound would have sintered in some degree between the original particles therein, and the mean particle size D$_{50}$ thereof was 13.50 μm, and the BET specific surface area thereof was 53.01 m$^2$/g.

In the release test as in Comparative Example 1, the release test slurry was prepared by adding the iron oxide compound (hematite) to the slurry of a dry solid of the scorodite-type iron-arsenic compound. In this, the amount of the iron oxide compound was 10 parts by mass relative to 100 parts by mass of the iron-arsenic compound. The slurry was tested in the release test under the same condition as in Comparative Example 1 except that the iron oxide compound was added thereto. As a result, the pH after shaken was 7.85, and the arsenic concentration was less than 0.01 mg/L (lower than the detection limit).

Example 18

A release test slurry was prepared and tested in the same release test as in Example 17, for which, however, the amount of the iron oxide compound was 5 parts by mass relative to 100 parts by mass of the iron-arsenic compound. As a result, the pH after shaken was 7.32, and the arsenic concentration was less than 0.01 mg/L (lower than the detection limit).

Example 19

A release test slurry was prepared and tested in the same release test as in Example 17, for which, however, the amount of the iron oxide compound was 2 parts by mass relative to 100 parts by mass of the iron-arsenic compound. As a result, the pH after shaken was 6.19, and the arsenic concentration was less than 0.01 mg/L (lower than the detection limit).

Example 20

A release test slurry was prepared and tested in the same release test as in Example 17, for which, however, the amount of the iron oxide compound was 1 part by mass relative to 100 parts by mass of the iron-arsenic compound. As a result, the pH after shaken was 4.62, and the arsenic concentration was less than 0.01 mg/L (lower than the detection limit).

TABLE 1

| | | Iron Oxide Compound | | | | Release Concentration | | |
|---|---|---|---|---|---|---|---|---|
| Example No. | Substance | Mean Particle Size (μm) | BET Specific Surface Area (m$^2$/g) | Amount Incorporated (part by mass) *1 | pH after shaken | AS (mg/L) | Fe (mg/L) | S (mg/L) |
| Comparative Example 1 | — | — | — | — | 3.61 | 0.26 | 2.06 | <10 |
| Example 1 | hematite | 20.22 | 4.64 | 10 | 3.72 | 0.02 | 0.14 | <10 |
| Example 2 | (reagent) | | | 5 | 3.79 | 0.04 | 0.82 | <10 |
| Example 3 | | | | 2 | 3.68 | 0.13 | 2.16 | <10 |
| Example 4 | | | | 1 | 3.74 | 0.14 | 1.89 | <10 |
| Example 5 | goethite | 8.59 | 40.91 | 10 | 3.31 | <0.01 | <0.23 | <10 |
| Example 6 | | | | 5 | 3.46 | <0.01 | 3.08 | 20 |
| Example 7 | | | | 2 | 3.58 | 0.01 | 2.75 | 10 |
| Example 8 | | | | 1 | 3.62 | 0.03 | 2.95 | 10 |
| Example 9 | goethite + | 25.48 | 46.59 | 10 | 3.56 | <0.01 | <0.23 | <10 |
| Example 10 | hematite | | | 5 | 3.65 | 0.01 | 0.51 | 20 |
| Example 11 | | | | 2 | 3.71 | 0.01 | 1.17 | 10 |
| Example 12 | | | | 1 | 3.77 | 0.04 | 1.43 | 10 |
| Example 13 | goethite | 9.01 | 46.57 | 10 | 6.70 | <0.01 | 4.50 | 40 |
| Example 14 | | | | 5 | 6.08 | <0.01 | <0.23 | <10 |
| Example 15 | | | | 2 | 5.07 | <0.01 | 0.37 | <10 |
| Example 16 | | | | 1 | 4.30 | <0.01 | 1.55 | <10 |
| Example 17 | hematite | 13.50 | 53.01 | 10 | 7.85 | <0.01 | <0.23 | 30 |
| Example 18 | | | | 5 | 7.32 | <0.01 | <0.23 | <10 |
| Example 19 | | | | 2 | 6.19 | <0.01 | <0.23 | <10 |
| Example 20 | | | | 1 | 4.62 | <0.01 | 0.36 | <10 |

*1 Part by mass relative to 100 parts by mass of iron-arsenic compound.

Figure 2:
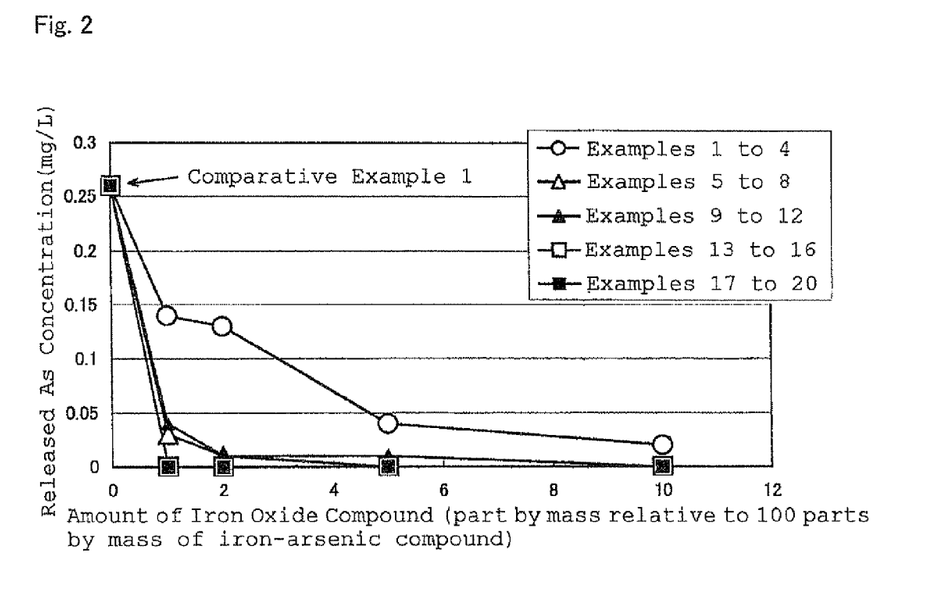
FIG. 2 is a graph showing the relationship between the amount of the iron oxide compound incorporated and the released arsenic concentration in Comparative Example 1 and Examples 1 to 20.

In Comparative Example 1 and Examples 1 to 20 given above, the relationship between the amount of the iron oxide compound and the released arsenic concentration is shown in FIG. 2. From Table 1 and FIG. 2, it is known that, when an iron oxide compound having a large BET specific surface area is used, then it stably exhibits an extremely excellent arsenic release-preventing effect even though its amount incorporated is small.

Comparative Example 2

Figure 3:
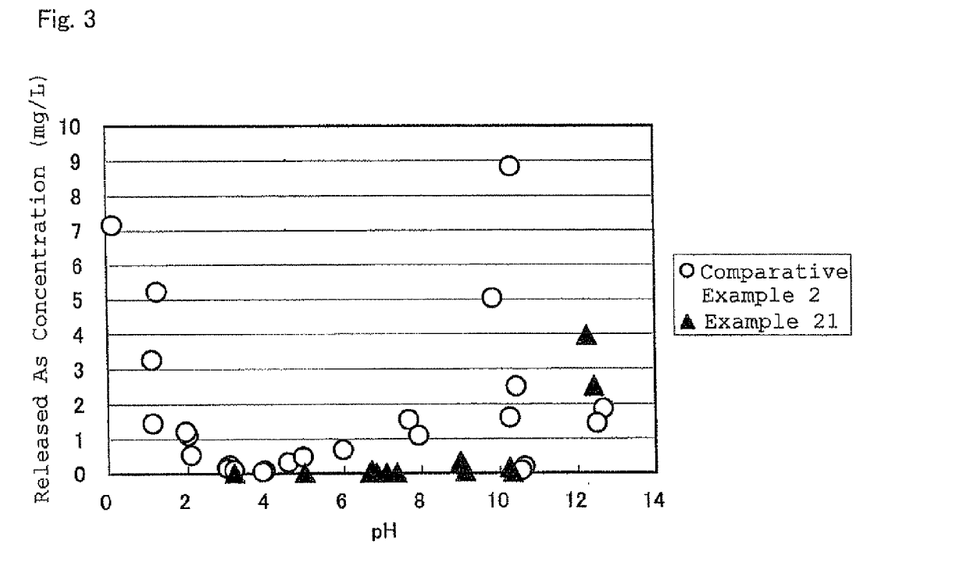
FIG. 3 is a graph showing the relationship between the pH of the liquid and the released arsenic concentration after a release test.

The same release test as in Comparative Example 1 was carried out. In this, however, various aqueous solutions of which the pH was changed variously with various pH-controlling agents as in Table 2 were used in place of the distilled water as the solvent in the release test. The other conditions were the same as in Comparative Example 1. The results are shown in Table 2. In FIG. 3, the relationship between the pH and the released arsenic concentration after the release test is plotted with "white rings".

Example 21

In the same manner as in Example 17, a release test slurry comprising 100 parts by mass of the scorodite-type iron-arsenic compound and 10 parts by mass of the iron oxide compound (hematite) was prepared and tested in a release test. In this, however, various aqueous solutions of which the pH was changed variously with various pH-controlling agents as in Table 3 were used in place of the distilled water as the solvent in the release test. The other conditions were the same as in Example 17. The results are shown in Table 3. In FIG. 3, the relationship between the pH and the released arsenic concentration after the release test is plotted with "dark triangles".

TABLE 2

| Group | pH-Controlling Agent | Solvent pH | pH after shaken | Release Concentration AS (mg/L) | Fe (mg/L) | S (mg/L) |
|---|---|---|---|---|---|---|
| Comparative Example 2 | Pure water | 5.74 | 4.57 | 0.32 | 0.61 | <10 |
| | TCLP | 3.00 | 3.01 | 0.16 | 0.98 | <10 |
| | | 4.88 | 4.95 | 0.48 | 0.37 | <10 |
| | $C_aO$ | 12.52 | 12.67 | 1.86 | <0.23 | <10 |
| | | 12.30 | 12.50 | 1.45 | 0.39 | <10 |
| | | 10.75 | 9.84 | 5.04 | 1.61 | <10 |
| | | 10.14 | 7.67 | 1.55 | 1.23 | <10 |
| | | 9.00 | 7.92 | 1.10 | 0.84 | <10 |
| | $Mg(OH)_2$ | 10.48 | 10.63 | 0.19 | <0.23 | <10 |
| | | 10.41 | 10.55 | 0.08 | <0.23 | <10 |
| | | 10.64 | 10.43 | 2.50 | <0.23 | <10 |
| | | 9.00 | 10.26 | 1.61 | <0.23 | <10 |
| | NaOH | 12.50 | 10.35 | 435 | 174 | <10 |
| | | 11.06 | 10.33 | 8.84 | 4.51 | <10 |
| | | 9.70 | 5.98 | 0.69 | 0.38 | <10 |
| | $H_2SO_4$ | 3.96 | 3.97 | 0.08 | 0.69 | <10 |
| | | 2.97 | 3.07 | 0.24 | 0.98 | <10 |
| | | 1.97 | 2.02 | 1.12 | 1.58 | 190 |
| | | 1.22 | 1.26 | 5.24 | 4.35 | 1600 |
| | | 0.35 | 0.43 | 25 | 20 | 15500 |
| | HCl | 3.99 | 3.95 | 0.06 | 0.71 | <10 |
| | | 2.99 | 3.03 | 0.15 | 1.11 | <10 |
| | | 1.98 | 1.96 | 1.22 | 2.33 | <10 |
| | | 1.11 | 1.12 | 3.27 | 3.57 | <10 |
| | | 0.13 | 0.20 | 64 | 51 | <10 |
| | $HNO_3$ | 3.98 | 3.91 | 0.05 | 0.69 | <10 |
| | | 2.99 | 3.18 | 0.10 | 1.12 | <10 |
| | | 1.99 | 2.09 | 0.54 | 1.51 | <10 |
| | | 1.12 | 1.13 | 1.46 | 3.04 | <10 |
| | | 0.12 | 0.15 | 7.17 | 8.10 | <10 |

TABLE 3

| Group | pH-Controlling Agent | Solvent pH | pH after shaken | Release Concentration AS (mg/L) | Fe (mg/L) | S (mg/L) |
|---|---|---|---|---|---|---|
| Example 21 | Pure Water | 5.74 | 6.70 | <0.01 | 4.50 | 40 |
| | TCLP | 3.00 | 3.19 | <0.01 | 2.96 | <10 |
| | | 4.88 | 4.99 | <0.01 | <0.23 | <10 |
| | $C_aO$ | 12.52 | 12.43 | 2.51 | <0.23 | 10 |
| | | 12.30 | 12.25 | 3.96 | <0.23 | <10 |
| | | 10.75 | 7.09 | <0.01 | <0.23 | <10 |
| | | 10.14 | 6.83 | <0.01 | <0.23 | <10 |
| | | 9.00 | 6.71 | 0.08 | <0.23 | <10 |
| | $Mg(OH)_2$ | 10.48 | 10.25 | 0.16 | <0.23 | <10 |
| | | 10.41 | 10.32 | <0.01 | <0.23 | <10 |
| | | 10.64 | 9.10 | 0.04 | <0.23 | <10 |
| | | 9.00 | 8.99 | 0.34 | <0.23 | <10 |
| | NaOH | 12.50 | 9.78 | 348 | 14 | 20 |
| | | 11.06 | 7.35 | <0.01 | <0.23 | <10 |
| | | 9.70 | 6.66 | <0.01 | <0.23 | <10 |

FIG. 3 confirms that the arsenic-containing solid of the example of the invention stably exhibits an excellent arsenic release-preventing effect in a broad pH range of at most around 10 as the pH after the release test. In Table 2 and Table 3, "TCLP" is the rule of "toxicity characteristic leaching procedure" in USA and Canada, in which is used a buffer solution of acetic acid and sodium hydroxide.

The invention claimed is:

1. An arsenic-containing solid comprising 100 parts by mass of a scorodite-type iron-arsenic compound and at least 0.5 parts by mass of an iron oxide compound added thereto.

2. The arsenic-containing solid according to claim 1, wherein the iron oxide compound has a BET specific surface area of at least 20 m$^2$/g.

3. The arsenic-containing solid according to claim 1, wherein the iron oxide compound has a BET specific surface area of at least 3 m$^2$/g and is added to the scorodite-type iron-arsenic compound in an amount of at least 5 parts by mass.

4. The arsenic-containing solid as claimed in claim 1, wherein the scorodite-type iron-arsenic compound is produced by adding an oxidizing agent to an aqueous acidic solution that contains a 5-valent arsenic (V) ion and a 2-valent iron (II) ion, then promoting the precipitation of an iron-arsenic compound with stirring the liquid, and finishing the precipitation thereof within a range where the pH of the liquid is at most 1.2.

5. The arsenic-containing solid as claimed in claim 1, wherein the iron oxide compound is at least one of iron on/hydroxide (FeOOH) and diiron trioxide (Fe$_2$O$_3$).

6. A method for producing an arsenic-containing solid of claim 1, comprising using a scorodite-type iron-arsenic compound having been processed in at least one solid-liquid separation step after its synthesis, preparing a slurry or a wet cake where the scorodite-type iron-arsenic compound particles and iron oxide compound particles coexist together, and collecting the solid fraction that constitutes the slurry or the wet cake.

7. The arsenic-containing solid as claimed in claim 2, wherein the scorodite-type iron-arsenic compound is produced by adding an oxidizing agent to an aqueous acidic solution that contains a 5-valent arsenic (V) ion and a 2-valent iron (II) ion, then promoting the precipitation of an iron-arsenic compound with stirring the liquid, and finishing the precipitation thereof within a range where the pH of the liquid is at most 1.2.

8. The arsenic-containing solid as claimed in claim 3, wherein the scorodite-type iron-arsenic compound is produced by adding an oxidizing agent to an aqueous acidic solution that contains a 5-valent arsenic (V) ion and a 2-valent iron (II) ion, then promoting the precipitation of an iron-arsenic compound with stirring the liquid, and finishing the precipitation thereof within a range where the pH of the liquid is at most 1.2.

9. The arsenic-containing solid as claimed in claim 2, wherein the iron oxide compound is at least one of iron oxyhydroxide (FeOOH) and diiron trioxide ($Fe_2O_3$).

10. The arsenic-containing solid as claimed in claim 3, wherein the iron oxide compound is at least one of iron oxyhydroxide (FeOOH) and diiron trioxide ($Fe_2O_3$).

11. The arsenic-containing solid as claimed in claim 4, wherein the iron oxide compound is at least one of iron oxyhydroxide (FeOOH) and diiron trioxide ($Fe_2O_3$).

12. A method for producing an arsenic-containing solid of claim 2, comprising using a scorodite-type iron-arsenic compound having been processed in at least one solid-liquid separation step after its synthesis, preparing a slurry or a wet cake where the scorodite-type iron-arsenic compound particles and iron oxide compound particles coexist together, and collecting the solid fraction that constitutes the slurry or the wet cake.

13. A method for producing an arsenic-containing solid of claim 3, comprising using a scorodite-type iron-arsenic compound having been processed in at least one solid-liquid separation step after its synthesis, preparing a slurry or a wet cake where the scorodite-type iron-arsenic compound particles and iron oxide compound particles coexist together, and collecting the solid fraction that constitutes the slurry or the wet cake.

14. A method for producing an arsenic-containing solid of claim 4, comprising using a scorodite-type iron-arsenic compound having been processed in at least one solid-liquid separation step after its synthesis, preparing a slurry or a wet cake where the scorodite-type iron-arsenic compound particles and iron oxide compound particles coexist together, and collecting the solid fraction that constitutes the slurry or the wet cake.

15. A method for producing an arsenic-containing solid of claim 5, comprising using a scorodite-type iron-arsenic compound having been processed in at least one solid-liquid separation step after its synthesis, preparing a slurry or a wet cake where the scorodite-type iron-arsenic compound particles and iron oxide compound particles coexist together, and collecting the solid fraction that constitutes the slurry or the wet cake.

* * * * *